(12) United States Patent
Chiu et al.

(10) Patent No.: US 8,310,814 B2
(45) Date of Patent: Nov. 13, 2012

(54) STACKED CAPACITOR WITH POSITIVE MULTI-PIN STRUCTURE

(75) Inventors: Chi-Hao Chiu, Hsinchu (TW); Yui-Hsin Fran, Hsinchu (TW); Ching-Feng Lin, Hsinchu County (TW); Chun-Chia Huang, Xinying (TW)

(73) Assignee: Apaq Technology Co., Ltd., Miaoli County (TW)

( * ) Notice: Subject to any disclaimer, the term of this patent is extended or adjusted under 35 U.S.C. 154(b) by 316 days.

(21) Appl. No.: 12/588,186

(22) Filed: Oct. 7, 2009

(65) Prior Publication Data

US 2011/0002087 A1 Jan. 6, 2011

(30) Foreign Application Priority Data

Jul. 3, 2009 (TW) .............................. 98122561 A

(51) Int. Cl.
- *H01G 9/00* (2006.01)
- *H01G 5/38* (2006.01)
- *H01G 4/30* (2006.01)
- *H01G 4/228* (2006.01)

(52) U.S. Cl. ..................... 361/523; 361/541; 361/301.4; 361/306.1; 361/306.3

(58) Field of Classification Search .................. 361/523, 361/541, 301.4, 306.3, 303, 306.1
See application file for complete search history.

(56) References Cited

U.S. PATENT DOCUMENTS

| | | | |
|---|---|---|---|
| 6,816,358 B2 * | 11/2004 | Kida et al. | 361/540 |
| 6,954,351 B2 * | 10/2005 | Konuma et al. | 361/523 |
| 2002/0015277 A1 * | 2/2002 | Nitoh et al. | 361/523 |
| 2010/0149729 A1 * | 6/2010 | Nishioka | 361/525 |

* cited by examiner

*Primary Examiner* — Eric Thomas
*Assistant Examiner* — Arun Ramaswamy
(74) *Attorney, Agent, or Firm* — Rosenberg, Klein & Lee

(57) ABSTRACT

A stacked capacitor with positive multi-pin structure includes a plurality of capacitor units, a substrate unit and a package unit. Each capacitor unit has a positive electrode that has a positive pin extended outwards therefrom. The positive pins of the capacitor units are divided into a plurality of positive pin units that are separated from each other, and the positive pins of each positive pin unit are electrically stacked onto each other. Each capacitor unit has a negative electrode, and the negative electrodes of the capacitor units are electrically stacked onto each other. The substrate unit has a positive guiding substrate electrically connected to the positive pins of the capacitor units and a negative guiding substrate electrically connected to the negative electrodes of the capacitor units. The package unit covers the capacitor units and one part of the substrate unit.

14 Claims, 4 Drawing Sheets

STACKED CAPACITOR WITH POSITIVE MULTI-PIN STRUCTURE

BACKGROUND OF THE INVENTION

1. Field of the Invention

The present invention relates to a stacked capacitor, in particular, to a stacked capacitor with positive multi-pin structure.

2. Description of Related Art

Various applications of capacitors include home appliances, computer motherboards and peripherals, power supplies, communication products and automobiles. The capacitors are mainly used to provide filtering, bypassing, rectifying, coupling, blocking or transforming function, which play an important role in the electric and electronic products. There are different capacitors, such as aluminum electrolytic capacitors, tantalum electrolytic capacitors or laminated ceramic capacitors, in different utilization.

A typical aluminum electrolytic capacitor includes an anode foil and a cathode foil processed by surface-enlargement and/or formation treatments. The surface-enlargement treatment is performed by etching a high purity aluminum foil to increase its surface area so that a high capacitor can be obtained to achieve miniaturized electrolytic capacitor. The anode aluminum foil is then subjected to the formation treatment to form a dielectric surface film. A thickness of the dielectric film is related to a supply voltage of the electrolytic capacitor. Normally the cathode foil will be subjected to the formation treatment, too. However, if no formation treatment on the cathode foil, an oxide film layer will be still formed on the surface when exposed in the air. After cutting to a specific size according to design spec., a laminate made up of the anode foil, the cathode foil which is opposed to the dielectric film of the anode foil and has etched surfaces, and a separator interposed between the anode and cathode foils, is wound to provide an element. The wound element does not have any electric characteristic of the electrolytic capacitor yet until completely dipped in an electrolytic solution for driving and housed in a metallic sheathed package in cylindrical form with a closed-end equipping a releaser. Furthermore, a sealing member made of elastic rubber is inserted into an open-end section of the sheathed package, and the open-end section of the sheathed package is sealed by drawing, whereby an aluminum electrolytic capacitor is constituted.

In fact, the electrolytic capacitor utilizes the mobility of ions in the electrolytic solution to obtain an electric circuit; therefore, the electrical conductivity of the electrolytic solution is an important factor for deciding performance of the electrolytic capacitor. Such that, it is an issue for how to promote the electrical conductivity of the electrolytic solution to maintain the electrolytic capacitor with high-temperature stability on the solution, the aluminum foils, the separator and etc., especially the stability of the solution and the aluminum foils. A typical electrolytic solution for a conventional electrolytic capacitor, especially for those electrolytic capacitors work on a supply voltage under 100V, includes water, organic solvent, organic acid, inorganic acid and some special additives mixed in different proportions.

Moreover, because solid electrolytic capacitor has the advantages as a decoupling element in the power circuit of a central processing unit (CPU). In general, a plurality of capacitor elements is stacked together to form a solid electrolytic capacitor with a high capacitor. In addition, the solid electrolytic capacitor of the prior art includes a plurality of capacitor elements and a lead frame. Each capacitor element includes an anode part, a cathode part and an insulating part. The insulating part electrically insulates the anode part and the cathode part from each other. More specifically, the cathode parts of the capacitor elements are stacked over one another. Furthermore, conductive layers are disposed between adjacent capacitor elements so that the capacitor elements are electrically connected to one another.

Furthermore, the winding capacitor includes a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal.

SUMMARY OF THE INVENTION

In view of the aforementioned issues, the present invention provides a stacked capacitor with positive multi-pin structure. The stacked capacitor of the present invention has the following advantages:

1. Large area, large capacity, low profile and low cost.
2. The LC (Leakage Current) and the phenomenon of the short circuit are decreased.
3. The soldering difficulty and the ESR (Equivalent Series Resistance) are decreased.

To achieve the above-mentioned objectives, the present invention provides a stacked capacitor with positive multi-pin structure, including: a plurality of capacitor units, a substrate unit and a package unit. Each capacitor unit has a positive electrode that has a positive pin extended outwards therefrom. The positive pins of the capacitor units are divided into a plurality of positive pin units that are separated from each other, and the positive pins of each positive pin unit are electrically stacked onto each other. Each capacitor unit has a negative electrode, and the negative electrodes of the capacitor units are electrically stacked onto each other. The substrate unit has a positive guiding substrate electrically connected to the positive pins of the capacitor units and a negative guiding substrate electrically connected to the negative electrodes of the capacitor units. The package unit covers the capacitor units and one part of the substrate unit.

Therefore, the present invention has a plurality of positive pins extended from the positive electrodes of the capacitor units and electrically stacked onto each other by soldering, so that the soldering difficulty and the ESR (Equivalent Series Resistance) are decreased.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Referring to FIGS. 1A to 1E, the present invention provides a stacked capacitor with positive multi-pin structure, including: a plurality of capacitor units 1, a substrate unit 2 and a package unit 3.

Figure 1A:
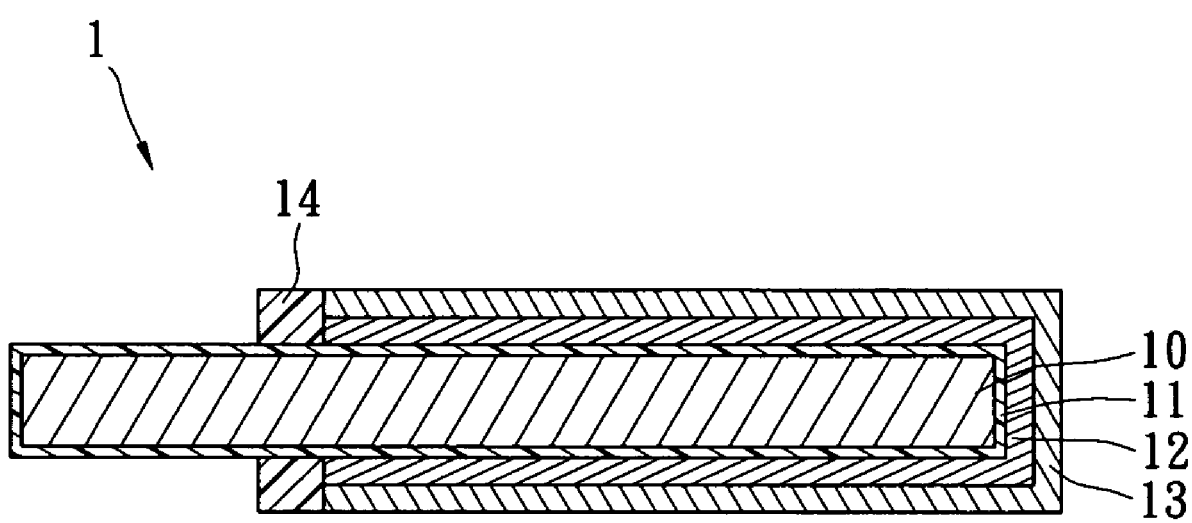
FIG. 1A is a lateral, cross-sectional, schematic view of the capacitor unit of the stacked capacitor with positive multi-pin structure according to the present invention.
Figure 1B:
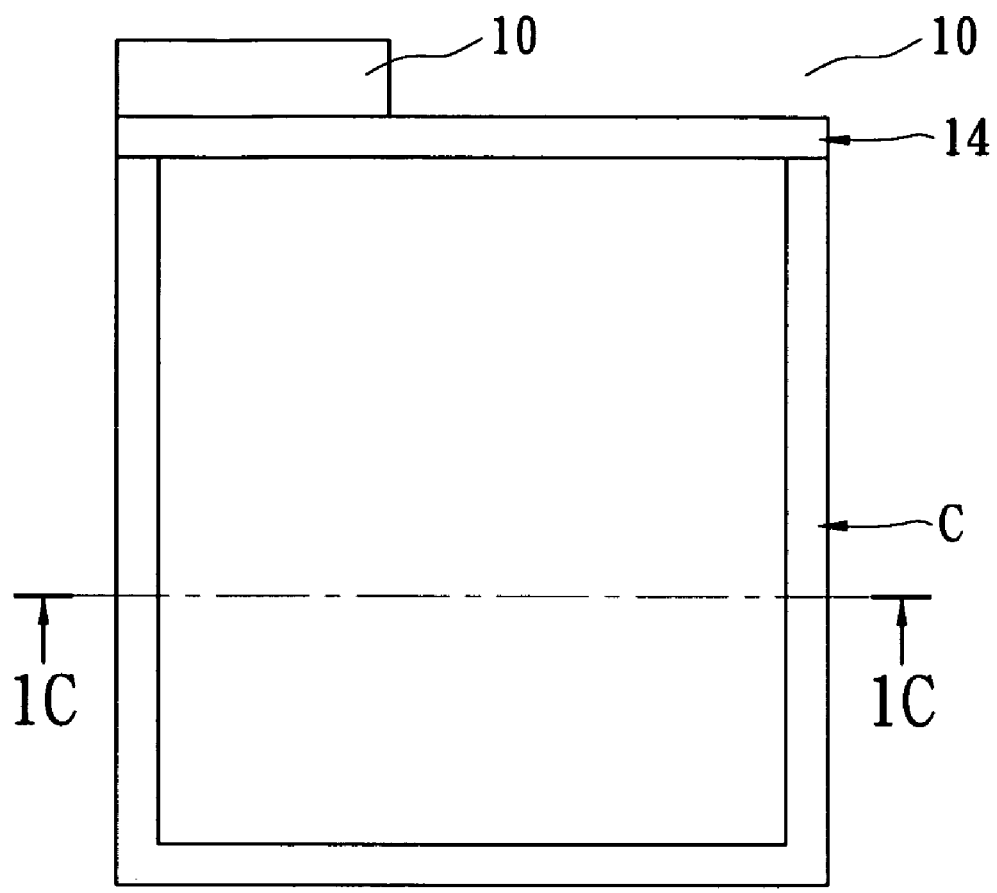
FIG. 1B is a top, schematic view of the resin body installed on an edge of the valve metal foil according to the present invention.
Figure 1C:
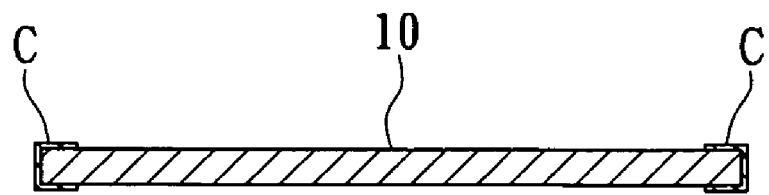
FIG. 1C is an exploded, schematic view along line 1C-1C of FIG. 1B.

Referring to FIGS. 1A to 1C, each capacitor unit 1 has a valve metal foil 10, an oxide insulation layer 11 covering the valve metal foil 10, a conductive polymer layer 12 covering one side of the oxide insulation layer 11 and a carbon glue layer 13 covering the conductive polymer layer 12. In addition, each capacitor unit 1 has a plurality of insulating layers 14, and each insulating layer 14 is disposed around one part of an external surface of each valve metal foil 10 in order to limit the lengths of the conductive polymer layers 12 and the carbon glue layers 13. In other words, each insulating layer 14 is disposed around one part of a top, a bottom, a left and a right surfaces of each valve metal foil 10. Each insulating layer 14 is an insulating line between the positive electrode and the negative electrode of the each capacitor unit 1. Moreover, each valve metal foil 10 has a resin body C selectively installed on an edge thereof.

Figure 1D:
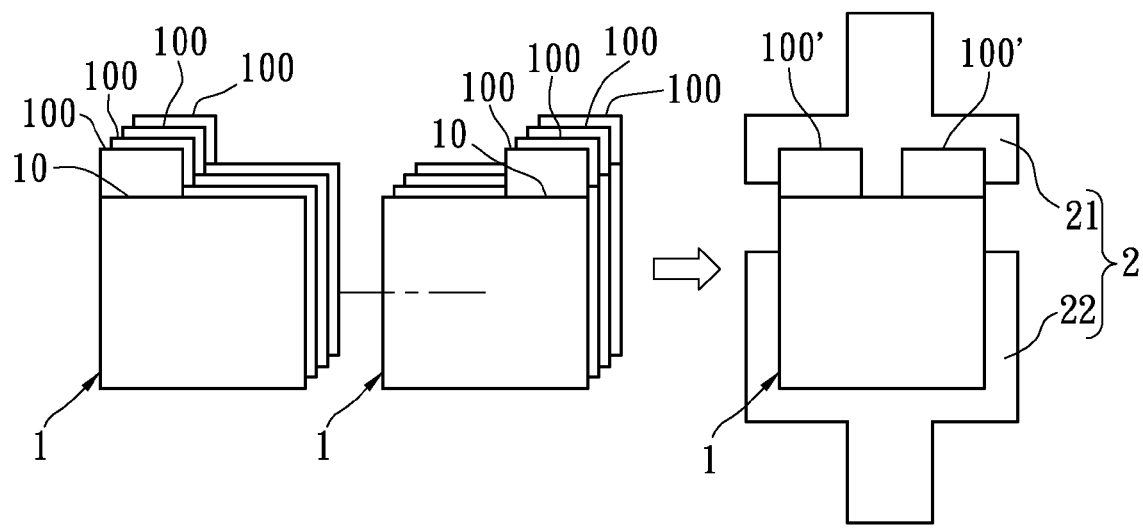
FIG. 1D is a schematic view of first stack method of the positive pins of the stacked capacitor according to the present invention.
Figure 1E:
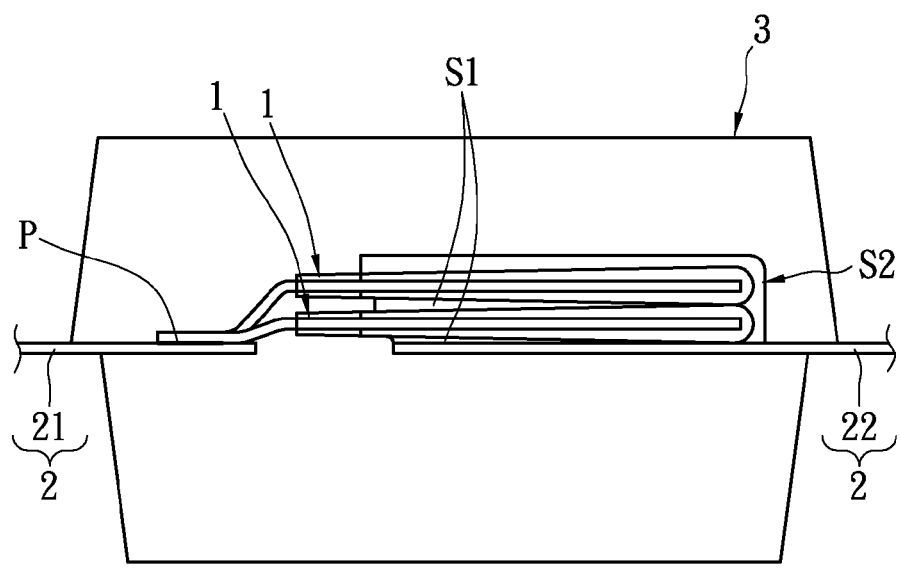
FIG. 1E is a lateral, exploded, schematic view of first type of the stacked capacitor with positive multi-pin structure according to the present invention.

Furthermore, referring to FIGS. 1D and 1E, each capacitor unit 1 has a positive electrode that has a positive pin 100 extended outwards therefrom. The positive pins 100 of the capacitor units 1 are divided into a plurality of positive pin units 100' that are separated from each other, the positive pins 100 of each positive pin unit 100' are electrically stacked onto each other by a plurality of soldering points P (as shown in FIG. 1E). In other words, the valve metal foil 10 of each capacitor unit 1 has a positive pin 100 extended outwards therefrom, and the positive pins 100 are divided into a plurality of positive pin units 100' that are electrically stacked onto each other (for example, the two sets of positive pin units 100' are shown in FIG. 1D). In addition, the positive pins 100 are respectively extended outwards from the valve metal foils 10 along the same direction. Only four layers of soldering can achieve eight layers of stacking as showing in FIG. 1D.

Moreover, there is a conductive layer S1 coated between every two capacitor units 1. For example, the negative electrodes of the capacitor units 1 are electrically stacked onto each other by silver glue or silver paste. In other words, the carbon glue layers 13 of the capacitor units 1 are electrically stacked onto each other by the conductive layers S1. In addition, there is a conductive layer S2 such as silver glue or silver paste formed on the topmost capacitor unit 1 and on the lateral side of each capacitor units 1.

Furthermore, the substrate unit 2 has a positive guiding substrate 21 electrically connected to the positive pins 100 of the capacitor units 1 and a negative guiding substrate 22 electrically connected to the negative electrodes of the capacitor units 1. In addition, the package unit 3 covers the capacitor units 1 and one part of the substrate unit 2

Figure 2:
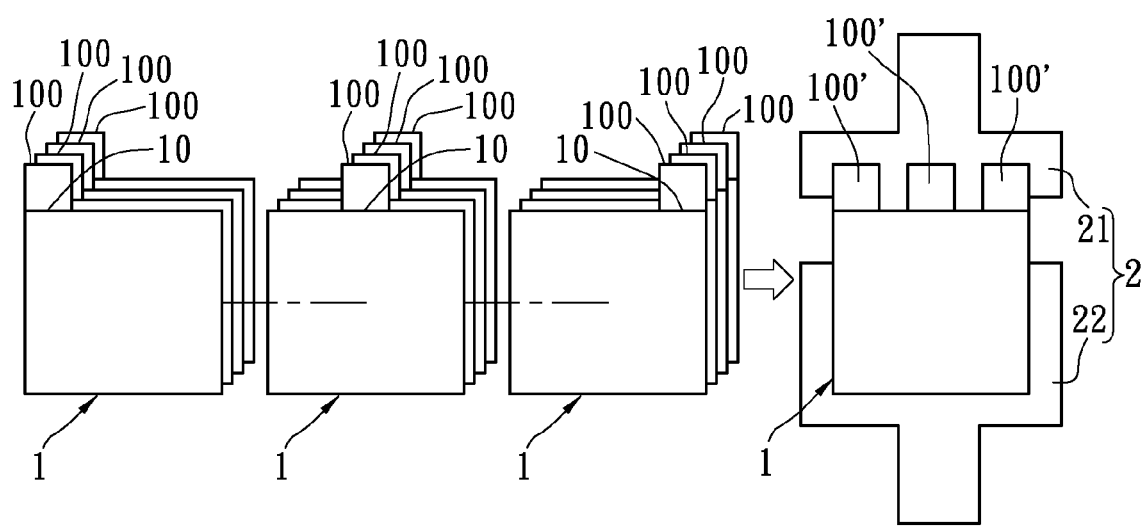
FIG. 2 is a schematic view of second stack method of the positive pins of the stacked capacitor according to the present invention.

Referring to FIG. 2, the present invention can use three sets of capacitor unit 1. The valve metal foil 10 of each capacitor unit 1 has a positive pin 100 extended outwards therefrom, and the positive pins 100 are divided into a plurality of positive pin units 100' that are electrically stacked onto each other. In addition, the positive pins 100 are respectively extended outwards from the valve metal foils 10 along the same direction. Only four layers of soldering can achieve twelve layers of stacking as showing in FIG. 2. In addition, the substrate unit 2 has a positive guiding substrate 21 electrically connected to the positive pins 100 of the capacitor units 1 and a negative guiding substrate 22 electrically connected to the negative electrodes of the capacitor units 1.

Figure 3:
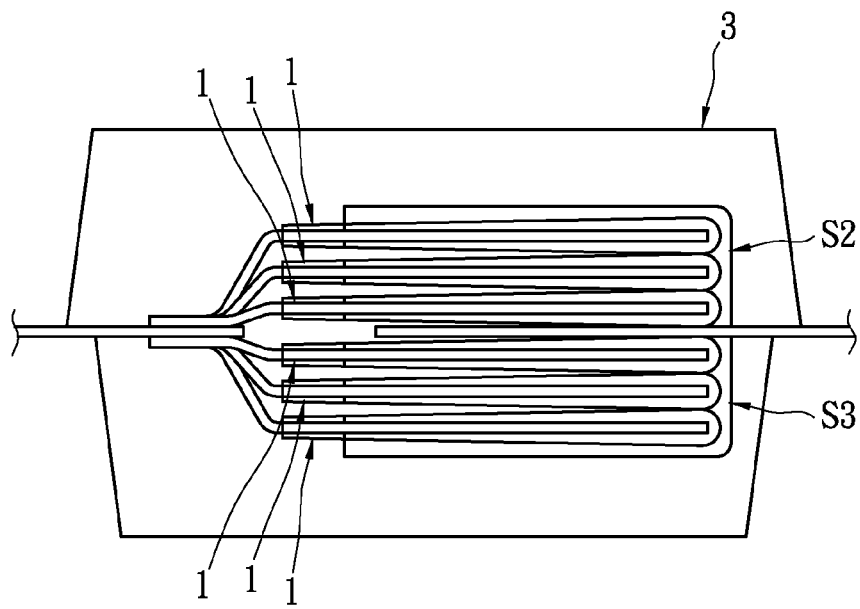
FIG. 3 is a lateral, exploded, schematic view of second type of the stacked capacitor with positive multi-pin structure according to the present invention.

Referring to FIG. 3, the present invention discloses a two-side stacked capacitor, and the two-side stacked capacitor can lack the usage of the conductive layer S1 as shown in FIG. 1E according to the number of the capacitor units. In other words, the carbon glue layers 13 of the capacitor units 1 can be directly electrically stacked onto each other. In addition, there is a conductive layer S2 such as silver glue or silver paste formed on the topmost capacitor unit 1 and on the lateral side of each capacitor units 1, and there is a conductive layer S3 formed on the bottommost capacitor unit 1 and on the lateral side of each capacitor units 1.

In conclusion, the present invention has a plurality of positive pins extended from the positive electrodes of the capacitor units and electrically stacked onto each other by soldering, so that the soldering difficulty and the ESR (Equivalent Series Resistance) are decreased.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A stacked capacitor having a positive multi-pin structure, comprising:

a substrate unit including a positive guiding substrate and a negative guiding substrate;

a plurality of first capacitor units and a plurality of second capacitor units, wherein the first capacitor units and the second capacitor units are alternately stacked on top of one another, wherein each first capacitor unit includes a first positive electrode electrically connected to the positive guiding substrate and a first negative electrode electrically connected to the negative guiding substrate, the first positive electrode of each first capacitor unit has a first positive pin extended outwardly along a first predetermined direction, and the first positive pins of the first positive electrodes are stacked on top of one another, wherein each second capacitor unit includes a second positive electrode electrically connected to the positive guiding substrate and a second negative electrode electrically connected to the negative guiding substrate, the second positive electrode of each second capacitor unit has a second positive pin extended outwardly along a second predetermined direction, and the second positive pins of the second positive electrodes are stacked on top of one another, wherein the second positive pins of the second positive electrodes are separated from the first positive pins of the first positive electrodes, and the first predetermined direction and the second predetermined direction are the same direction; and a package unit enclosing the first capacitor units, the second capacitor units, one part of the positive guiding substrate and one part of the negative guiding substrate.

2. The stacked capacitor according to claim 1, wherein each first capacitor unit or each second capacitor unit has a valve metal foil, an oxide insulation layer enclosing the valve metal foil, a conductive polymer layer covering one part of the oxide insulation layer, and a carbon glue layer covering the conductive polymer layer.

3. The stacked capacitor according to claim 2, wherein each valve metal foil has a resin body disposed on an edge thereof.

4. The stacked capacitor according to claim 2, wherein each first capacitor unit or each second capacitor unit has a plurality of insulating layers, and each insulating layer is disposed around one part of an external surface of each corresponding valve metal foil to limit the lengths of the conductive polymer layers and the carbon glue layers.

5. The stacked capacitor according to claim 2, wherein the carbon glue layers are stacked on top of one another through silver glue or silver paste.

6. The stacked capacitor according to claim 2, wherein the carbon glue layers are directly stacked on top of one another.

7. The stacked capacitor according to claim 1, wherein the bottommost first positive pin and the bottommost second positive pin contact the same surface of the positive guiding substrate, the other first positive pins are stacked on top of one another and disposed on the bottommost first positive pin, and the other second positive pins are stacked on top of one another and disposed on the bottommost second positive pin.

8. A stacked capacitor having a positive multi-pin structure, comprising:

a substrate unit including a positive guiding substrate and a negative guiding substrate;

a plurality of first capacitor units, a plurality of second capacitor units and a plurality of third capacitor units, wherein the first capacitor units, the second capacitor units and the third capacitor units are alternately stacked on top of one another, wherein each first capacitor unit includes a first positive electrode electrically connected to the positive guiding substrate and a first negative electrode electrically connected to the negative guiding substrate, the first positive electrode of each first capacitor unit has a first positive pin extended outwardly along a first predetermined direction, and the first positive pins of the first positive electrodes are stacked on top of one another, wherein each second capacitor unit includes a second positive electrode electrically connected to the positive guiding substrate and a second negative electrode electrically connected to the negative guiding substrate, the second positive electrode of each second capacitor unit has a second positive pin extended outwardly along a second predetermined direction, and the second positive pins of the second positive electrodes are stacked on top of one another, wherein each third capacitor unit includes a third positive electrode electrically connected to the positive guiding substrate and a third negative electrode electrically connected to the negative guiding substrate, the third positive electrode of each third capacitor unit has a third positive pin extended outwardly along a third predetermined direction, and the third positive pins of the third positive electrodes are stacked on top of one another, wherein the third positive pins of the third positive electrodes are separated from the second positive pins of the second positive electrodes, the second positive pins of the second positive electrodes are separated from the first positive pins of the first positive electrodes, and the first predetermined direction, the second predetermined direction and the third predetermined direction are the same direction; and a package unit enclosing the first capacitor units, the second capacitor units, the third capacitor units, one part of the positive guiding substrate and one part of the negative guiding substrate.

9. The stacked capacitor according to claim 8, wherein each first capacitor unit, each second capacitor unit or each third capacitor unit has a valve metal foil, an oxide insulation layer enclosing the valve metal foil, a conductive polymer layer covering one part of the oxide insulation layer, and a carbon glue layer covering the conductive polymer layer.

10. The stacked capacitor according to claim 9, wherein each valve metal foil has a resin body disposed on an edge thereof.

11. The stacked capacitor according to claim 9, wherein each first capacitor unit, each second capacitor unit or each third capacitor unit has a plurality of insulating layers, and each insulating layer is disposed around one part of an external surface of each corresponding valve metal foil to limit the lengths of the conductive polymer layers and the carbon glue layers.

12. The stacked capacitor according to claim 9, wherein the carbon glue layers are stacked on top of one another through silver glue or silver paste.

13. The stacked capacitor according to claim 9, wherein the carbon glue layers are directly stacked on top of one another.

14. The stacked capacitor according to claim 8, wherein the bottommost first positive pin, the bottommost second positive pin and the bottommost third positive pin contact the same surface of the positive guiding substrate, the other first positive pins are stacked on top of one another and disposed on the bottommost first positive pin, the other second positive pins are stacked on top of one another and disposed on the bottommost second positive pin, and the other third positive pins are stacked on top of one another and disposed on the bottommost third positive pin.

* * * * *